(12) United States Patent
Meyer

(10) Patent No.: US 11,273,808 B2
(45) Date of Patent: Mar. 15, 2022

(54) METHOD FOR DETERMINING AUTONOMOUS EMERGENCY BRAKING, METHOD FOR PERFORMING THE EMERGENCY BRAKING, AND CONTROL DEVICE FOR A DRIVING-DYNAMICS SYSTEM

(71) Applicant: WABCO Europe BVBA, Brussels (BE)

(72) Inventor: Ruediger Meyer, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 165 days.

(21) Appl. No.: 16/609,798

(22) PCT Filed: Apr. 13, 2018

(86) PCT No.: PCT/EP2018/059524
§ 371 (c)(1),
(2) Date: Oct. 31, 2019

(87) PCT Pub. No.: WO2018/210500
PCT Pub. Date: Nov. 22, 2018

(65) Prior Publication Data
US 2020/0055500 A1    Feb. 20, 2020

(30) Foreign Application Priority Data

May 19, 2017   (DE) .................... 10 2017 111 003.8

(51) Int. Cl.
*B60T 8/1755*    (2006.01)
*B60T 7/12*    (2006.01)
(Continued)

(52) U.S. Cl.
CPC ............ *B60T 8/17558* (2013.01); *B60T 7/12* (2013.01); *B60W 30/09* (2013.01); *B60W 30/16* (2013.01);
(Continued)

(58) Field of Classification Search
CPC .. B60T 8/17558; B60T 7/12; B60T 2201/022; B60W 30/09; B60W 30/16; G08G 1/166
See application file for complete search history.

(56) References Cited

U.S. PATENT DOCUMENTS 5,601,347 A * 2/1997 Fischle ................... B60T 8/173
303/139
2006/0097570 A1    5/2006 Doerr et al.
(Continued)

FOREIGN PATENT DOCUMENTS

DE    10237714 A1    2/2004
DE    10258617 A1    4/2004
(Continued)

*Primary Examiner* — Hussein Elchanti
(74) *Attorney, Agent, or Firm* — Leydig, Voit & Mayer, Ltd.

(57) ABSTRACT

A method for ascertaining an autonomous emergency braking operation of an ego-vehicle. The method includes picking up driving dynamics variables of the ego-vehicle, picking up distance measurement signals, and ascertaining at least one longitudinal distance of the ego-vehicle from a forward object. The method further includes determining whether an emergency braking operation is to be initiated on the basis of the driving dynamics variables and the distance measurement signals. If a decision is made to initiate an emergency braking operation, the method additionally includes ascertaining a first starting point for initiating a warning phase by outputting a warning signal without initiating a braking operation, a second starting point for initiating a subsequent partial braking phase with a lower partial-braking braking pressure, and a third starting point for initiating a subsequent emergency braking phase to initiate an emergency braking phase with a higher emergency-braking braking pressure.

13 Claims, 3 Drawing Sheets

(51) Int. Cl.
*B60W 30/09* (2012.01)
*B60W 30/16* (2020.01)
*G08G 1/16* (2006.01)

(52) U.S. Cl.
CPC ........ *G08G 1/166* (2013.01); *B60T 2201/022* (2013.01)

(56) References Cited

U.S. PATENT DOCUMENTS

| | | |
|---|---|---|
| 2006/0163943 A1 | 7/2006 | Von Holt et al. |
| 2010/0102622 A1* | 4/2010 | Favaretto ................ B60K 6/48 303/152 |
| 2011/0295479 A1* | 12/2011 | Nodera ................ F02D 11/105 701/70 |
| 2013/0261951 A1* | 10/2013 | Sekiguchi ............... B60T 8/172 701/301 |
| 2015/0012204 A1 | 1/2015 | Breuer et al. |
| 2016/0052511 A1* | 2/2016 | Takeuchi ................ B60K 6/48 701/22 |
| 2016/0194000 A1* | 7/2016 | Taki ..................... B60W 30/08 701/70 |

FOREIGN PATENT DOCUMENTS

| | | |
|---|---|---|
| DE | 102005054754 A1 | 5/2007 |
| DE | 102010008208 A1 | 8/2011 |
| DE | 102013008073 A1 | 11/2014 |
| DE | 102014008431 A1 | 11/2014 |
| EP | 2287059 A2 | 2/2011 |
| EP | 2407358 A1 | 1/2012 |
| EP | 2814704 B1 | 7/2016 |
| WO | WO 2004028847 A1 | 4/2004 |

* cited by examiner

METHOD FOR DETERMINING AUTONOMOUS EMERGENCY BRAKING, METHOD FOR PERFORMING THE EMERGENCY BRAKING, AND CONTROL DEVICE FOR A DRIVING-DYNAMICS SYSTEM

CROSS REFERENCE TO RELATED APPLICATIONS

This application is a U.S. National Phase Application under 35 U.S.C. § 371 of International Application No. PCT/EP2018/059524, filed on Apr. 13, 2018, and claims benefit to German Patent Application No. DE 10 2017 111 003.8, filed on May 19, 2017. The International Application was published in German on Nov. 22, 2018 as WO 2018/210500 under PCT Article 21(2).

FIELD

The invention relates to a method for ascertaining an autonomous emergency braking operation, a method for performing the autonomous emergency braking operation and a control device for a driving dynamics system of an ego-vehicle, in order to ascertain and carry out an autonomous emergency braking operation of this kind.

BACKGROUND

Such a method and such a control device are known e.g. from EP 2 814 704 B1. Autonomous emergency braking operations serve in particular to identify an emergency braking situation when ascertaining driving state variables and further measured variables, in particular a distance measurement in relation to a forward object, and to initiate a braking process autonomously, i.e. independently. To this end, e.g. a control device of the driving dynamics system can output an external braking signal (XBR) to a braking device control device so that the latter outputs a braking signal to wheel brakes. Furthermore, such a driving dynamics system may already be integrated in the braking device. Such an emergency braking system (autonomous emergency brake system, AEBS) can therefore be used to prevent a collision with or crash into a detected forward object completely, or else to reduce an accident severity.

Such emergency braking systems or emergency braking methods can therefore involve the use of the dynamic response of the ego-vehicle, e.g. as a motion equation with a second order of time (spatial function with a second order of time) along with the present position, the ego-velocity and the ego-acceleration, and applicable values can furthermore be formed for the detected object, so that motion equations of the ego-vehicle and of the object, or else difference values, i.e. a difference distance and difference velocities, are formed. This allows a dynamic criterion to be formed in a longitudinal direction (longitudinal-dynamics criterion). Furthermore, it is also possible for a transverse-dynamic response to be heeded, which can be ascertained e.g. as an evasion criterion and heeds a possible evasive maneuver by the driver to the side.

Such braking systems can furthermore have provision for a warning phase prior to initiation of the autonomous emergency braking operation, which involves a warning signal being indicated to the driver telling him that an emergency braking operation is imminent. The driver can therefore initiate a driver braking operation or else an evasive maneuver now, e.g. independently. Further, there may also be provision for the driver to put an end to the identified emergency braking situation because he recognizes that a false detection has occurred, and the alleged object must not be rated as a real object, but rather the distance sensor has identified e.g. a bridge or other constriction as an object presenting the risk of a collision.

Furthermore, haptic warning phases are known, in which the driver is notified of the imminent initiation of an emergency braking phase haptically, i.e. as a braking jolt, by means of a light braking operation.

After the warning phases, the emergency braking phase is then carried out, preferably with a maximum braking pressure.

In this context, there can be provision for minimum periods for the warning phase or the added warning phase in order to give the driver sufficient time.

SUMMARY

In an embodiment, the present invention provides a method for ascertaining an autonomous emergency braking operation of an ego-vehicle. The method includes picking up driving dynamics variables of the ego-vehicle, picking up distance measurement signals, and ascertaining at least one longitudinal distance of the ego-vehicle from a forward object. The method further includes determining whether an emergency braking operation is to be initiated on the basis of the driving dynamics variables and the distance measurement signals. If a decision is made to initiate an emergency braking operation, the method additionally includes ascertaining a first starting point for initiating a warning phase by outputting a warning signal without initiating a braking operation, a second starting point for initiating a subsequent partial braking phase with a lower partial-braking braking pressure, and a third starting point for initiating a subsequent emergency braking phase to initiate an emergency braking phase with a higher emergency-braking braking pressure. Ascertaining the starting points involves the use of a period criterion having minimum durations of the warning phase and/or of the partial braking phase, and a dynamic criterion describing positions and/or velocities of the ego-vehicle and of the object in the phases. Motion equations of the ego-vehicle and of the object with at least a second order of time are used in the dynamic criterion, and at least one of an emergency braking acceleration in the emergency braking phase and a partial braking acceleration in the partial braking phase are used in the dynamic criterion in order to heed a braking effect in the partial braking phase.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
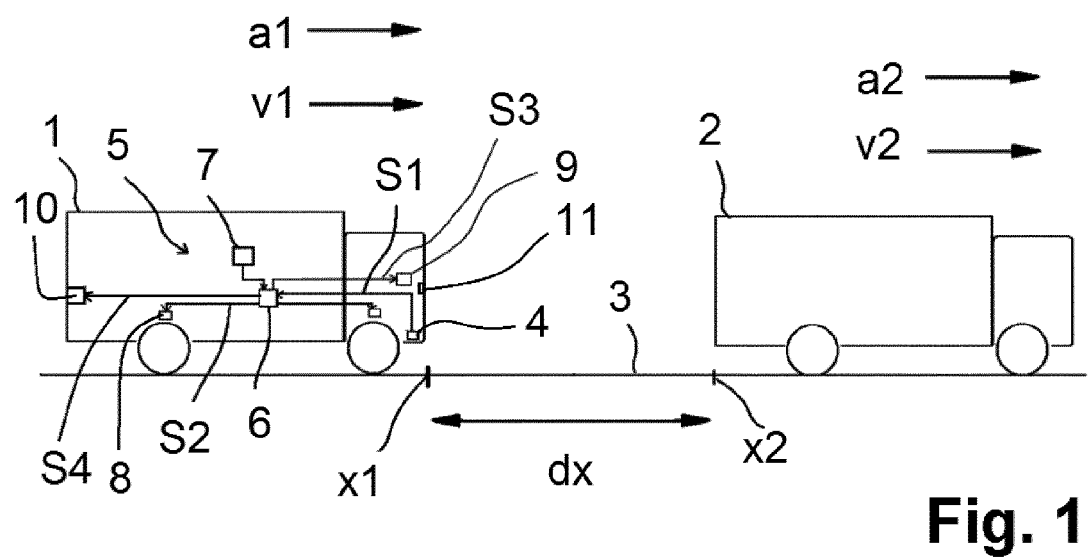
FIG. 1 shows a depiction of a road scene for an ego-vehicle according to an embodiment of the invention.

Ascertaining the emergency braking operation as a motion equation for time and use of periods for the warning phases prior to the initiation of the braking process can result in an extremely early time at which the warning phase is initiated. Very early first times for initiating the warning phase may possibly be unjustified, however, and can prompt the driver into risky behavior even though this is not yet imperative.

The invention provides methods for ascertaining an emergency braking operation, corresponding methods for performing an emergency braking operation, and control devices for carrying out such methods which allow safe emergency braking operations and reduce unnecessarily early initiations. Furthermore, the invention provides vehicles having such a control device.

The rating of the dynamic criterion, at least in some situations or traffic situations, can involve a partial braking effect during the haptic warning phase being heeded. In this context, it is recognized that in the haptic warning phase the light braking effect admittedly serves only as haptic feedback to the driver at first; however, this already achieves a certain braking effect that can certainly be heeded in order to ascertain the times for initiating the phases. It is therefore possible for a superior braking effect and hence overall shortening of the emergency braking process consisting of the multiple phases to be ascertained. It is therefore in particular already possible for the first time for initiating the warning phase to be deferred, i.e. initiated later.

This allows already available measured variables to be used to provide a more accurate method supplying a later first time for initiating the warning phase.

The partial braking effect can be heeded without exception or only in some traffic situations. According to one development, it is possible to identify that also heeding the partial braking effect during the haptic warning phase in such a way can be dangerous or problematic if the confidence in or reliability of such a partial braking operation is not a certainty. As such, some systems provide for the driver to be able to switch off the partial braking phase and possibly also the emergency braking phase and for just the warning to be output during the warning phase. The reliability of the measurement by the distance measuring system may also be at a reduced level. It may be possible to identify from the previous distance measurement signals that inaccuracies are present, e.g. as a result of indefinite values. If therefore a low level of reliability or low confidence is identified that is e.g. below a threshold value, it is possible to decide to ignore the partial braking effect during the haptic warning phase. If, on the other hand, there is a sufficient level of reliability or confidence, this partial braking effect can be heeded during the partial braking phase. There may thus preferably be provision for the partial braking effect to be heeded on the basis of the reliability of (confidence in) the situation.

This already shows that this intermittent or situation-dependent possible heeding of the partial braking effect during the haptic collision phase firstly ensures a high level of safety, since the partial braking phase is ignored in critical situations or situations that do not guarantee a high level of reliability. Nevertheless, a later time for initiating the warning phase can be chosen in many cases without critical situations arising.

According to the invention, there is provision for further developments. As a result of a brake light signal already being output to a brake light during the warning phase, the traffic behind can already be informed before the emergency braking phase that an emergency braking operation will take place soon. Critical situations as a result of vehicles approaching from behind can therefore already be reduced in good time.

Furthermore, in addition to purely heeding the longitudinal acceleration in the dynamic criterion (second criterion), it is also possible for an evasion criterion to be heeded as transverse response.

FIG. 1 illustrates an ego-vehicle 1 traveling on a road 3; it is at a first position or present ego-position x1, which in the present case is determined by the front end of the ego-vehicle 1, and travels at an ego-velocity of travel v1 (first velocity of travel) and with an ego-longitudinal acceleration a1 (first longitudinal acceleration). In this case, initially only movements in the longitudinal direction or x direction are considered in FIG. 1. Ahead of the ego-vehicle 1 there is an object 2, which e.g. may in turn be a vehicle. The object 2 is at a second position x2 (object position), which in the present case is determined by its position closest to the ego-vehicle 1, i.e. the rear end of the object 2, and travels at a second velocity v2 and with a second longitudinal acceleration a2. Between the ego-position x1 (first position) x1 and the second position x2, a longitudinal distance dx is therefore formed.

The ego-vehicle 1 has a distance sensor 4, e.g. based on radar, based on ultrasound or as a camera system for detecting the longitudinal distance dx, which outputs a relative-distance measurement signal S1 to a control device 6 of a driving dynamics system 5. In addition to the longitudinal distance dx, the relative-distance measurement signal S1 can also be measured a longitudinal velocity difference Dvx directly, and then in particular be calculated a longitudinal acceleration difference Dax. The ego-vehicle 1 or the driving dynamics system 5 thereof furthermore has a velocity sensor 7 for detecting the first velocity of travel v1, e.g. from the ABS wheel-speed sensors or else the speed of an output shaft. The control device 6 outputs braking signals S2 to wheel brakes 8 in order to perform a braking operation, which therefore produces a negative acceleration, i.e. a first longitudinal acceleration a1 having a negative value. Furthermore, the control device 6 outputs warning signals S3 to a warning indicator 9 for the driver, e.g. in the cockpit area of the ego-vehicle 1. The warning indicator 9 can be in acoustic and/or visual form.

The control device 6 can therefore produce respective spatial functions x(1) and x(2) on the basis of time, e.g. with a second order of time, for the ego-vehicle 1 and, accordingly, by ascertaining the time response of the longitudinal distance dx and if applicable the longitudinal velocity difference $D_{vx}$, also for the object 2, in particular using longitudinal-dynamic motion equations GL1, GL2, e.g.

$$\text{for the ego-vehicle 1: } x(1)=x1+v1\cdot t+a1\cdot 1/2\cdot t^2 \quad \text{(GL1); and}$$

$$\text{for the object 2: } x(2)=x2+v2\cdot t+a2\cdot 1/2\cdot t^2 \quad \text{(GL2),}$$

which can accordingly also be set up as a differential equation.

A more complex consideration can also involve the transverse-dynamic response being heeded as well.

It is therefore possible for the ego-vehicle 1 to be slowed firstly by the driver by means of driver braking operations, and furthermore by means of autonomous braking operations. To this end, an autonomous emergency braking system (AEBS) is produced or integrated in the control device 6 that is suitable for initiating autonomous emergency braking operations. The autonomous emergency braking operations may be designed in particular to avoid a collision with the forward object 2, and/or also to reduce the accident severity of an accident with the forward object 2.

When designing an external driving dynamics system 5, XBR commands (external brake requests) are produced and processed in order to initiate an autonomous braking operation, provision being able to be made for this by in particular a first control device for the driving dynamics system 5 and a further control device for the braking system of the ego-vehicle 1; to simplify illustration, FIG. 1 has provision for a joint control device 6 of the driving dynamics system 5; however, it is also possible for separate control devices to be produced and to communicate with one another.

Figure 2:
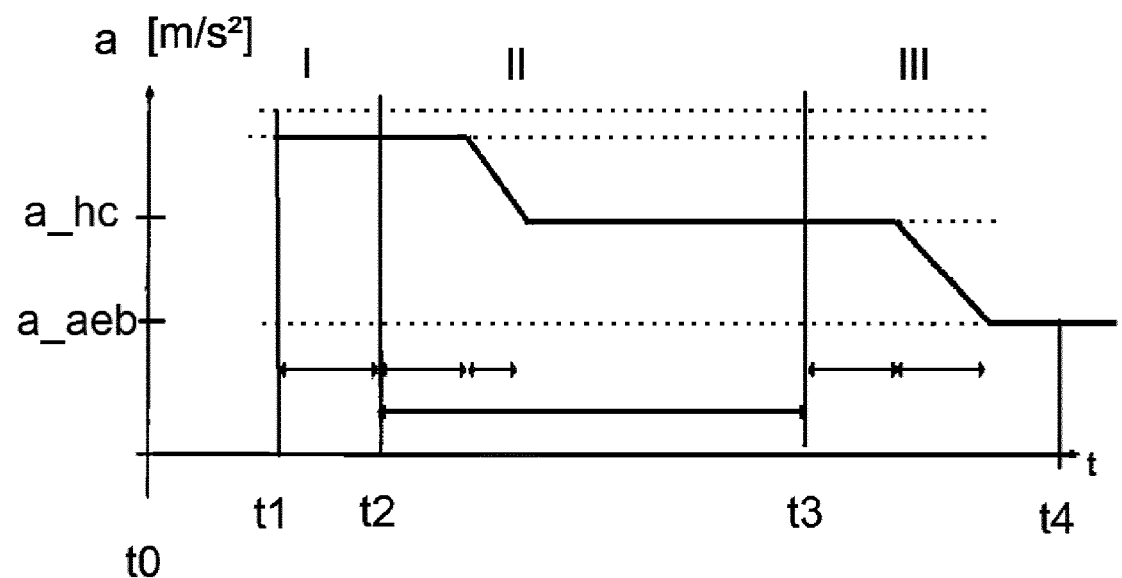
FIG. 2 shows the timing of various phases of a method according to an embodiment of the invention.

To initiate an emergency braking operation, there is provision for the following phases, which are depicted in FIG. 2, the abscissa plotted in FIG. 2 being time and the ordinate plotted being a longitudinal acceleration, i.e. downwardly increasing braking effect:

In a first warning phase I (FCW, forward collision warning), a warning is indicated to the driver by means of the warning indicator 9, e.g. as an audible sound or visual signal, without autonomous braking action, In a subsequent haptic warning phase or partial braking warning phase II (HCW, haptic collision warning), an autonomous partial braking operation takes place, i.e. with a braking pressure value p_hc that leads to a partial acceleration a_hc, e.g. with the acceleration value a_hc=−3.5 m/s$^2$. As a result, a haptic collision warning is output to the driver, who notices the braking jolt and thereby has his attention drawn to the imminent full braking operation or emergency braking operation.

In a subsequent emergency braking phase III (AEB, autonomous emergency braking), an emergency braking operation then takes place, in particular with the braking pressure p_aeb, which may in particular be a maximum braking pressure. The emergency braking acceleration a_aeb achieved is therefore preferably an acceleration of the maximum braking operation, e.g. with a_aeb=−6 m/s$^2$.

Advantageously, a brake light signal S4 is already output to brake lights 10 of the ego-vehicle 1 during the first warning phase I, so that the attention of the traffic behind is drawn to the imminent braking operation. During the calculation of the phases I, II, III, the following is heeded in the control device 6:

For the warning phase I and/or partial braking phase II, preferably minimum times are stipulated. As such, a first minimum period $\Delta t0\_I$ (warning phase minimum period) may be stipulated for the warning phase I, e.g. 0.6 seconds, and a second minimum period $\Delta t0\_II$ (partial braking phase minimum period) of, e.g., 1 second for the partial braking phase II, and/or a minimum warning time $\Delta t0\_w$ as the sum of these minimum periods, e.g. 1.6 seconds. If the driver himself actively operates the brake or initiates a driver braking process during the warning phase I and/or the partial braking warning phase II, this driver braking operation can have priority, or the partial braking operation and the driver braking operation can be heeded according to the maximum value principle, i.e. the higher braking pressure of the two is applied. Furthermore, the driver may in particular also be provided with the option of an evasive maneuver as a transverse-dynamic process during the two warning phases I, II, i.e. a control process by means of which he can possibly prevent a collision or reduce the collision severity.

In this case, the control device 6 in particular uses the dynamic motion equations, inter alia equations GL1, GL2, to calculate the first starting time t1 for initiating the warning phase 1, the second starting time t2 for initiating the partial braking phase II and the third starting time t3 for initiating the emergency braking phase III, and the periods $\Delta t\_I$, $\Delta t\_II$ and $\Delta t\_III$ of the three phases I, II, III, with e.g. the emergency braking operation being complete at the time t4, e.g. a standstill (v1=0) or else a collision being able to occur at t4.

FIG. 2 therefore describes a projected ideal trend according to one embodiment of a method according to the invention for ascertaining an emergency braking process, which, when the emergency braking method is performed, may subsequently be changed, in particular on the basis of present measurement data indicating changed inherent dynamics variables and/or a changed longitudinal distance dx.

The calculation involves the use of the following criteria:
a period criterion K1, according to which the warning phase I and the partial braking phase II need to comply with the aforementioned minimum time durations, i.e. their periods satisfy e.g. the following conditions:
$\Delta t\_I \geq \Delta t0\_I$ (condition K1-I)
$\Delta t\_II \geq \Delta t0\_II$ (condition K1-II)
a dynamic criterion K2, which can comprise in particular a longitudinal-dynamics criterion K2-L, for which the previous longitudinal dynamics and the accelerations attained by the autonomous actions are heeded and spatial functions for the second order of time are produced, i.e. in particular the aforementioned equations GL1, GL2. In this case, it is e.g. also possible for the condition to be presumed that dx(t4)>0, i.e. the longitudinal distance dx at the end time t4>0 and hence a collision has not taken place.

The emergency braking longitudinal acceleration a_aeb in the emergency braking phase III is heeded in the dynamic criterion K2.

Furthermore, according to a first embodiment, the HCW longitudinal acceleration a_hc provided for as a haptic signal in the partial braking phase III is also heeded. Therefore, an equation system is produced in which the different longitudinal accelerations, in particular a_hc and a_aeb, in the respective phases are heeded.

In this case, the buildup in the braking pressure over time until the full pressure value is reached is heeded in particular—as indicated by the oblique trend in FIG. 2—in each of the phases II, III.

Therefore, the braking effect a_hc of the partial braking phase II is also already heeded, it being identified in the present situation that the partial braking operation initially used for haptic feedback also results in a substantial effect, namely shortening of the overall period t4-t1. It is therefore in particular possible for a later time t1 to be stipulated than without any heeding of the partial acceleration a_hc.

Additionally, the transverse-dynamic response can also be heeded in the dynamic criterion K2 as a partial criterion K2-q, in particular as an evasive maneuver; it is therefore possible for e.g. a present transverse acceleration aq and/or yaw rate ω to be heeded.

According to this first embodiment, an advance calculation, which the control device 6 performs at the present time t0, therefore takes place in order to ascertain the starting times t1, t2, t3 at which the control device will initiate the next phase, heeding the partial braking longitudinal acceleration a_hc in the partial braking warning phase II.

According to a second embodiment, which is modified in this regard, the phases I, II, III are likewise performed in succession; the ascertainment of the times t1, t2 and t3 also involves the unchanged use of the period criterion K1. However, the ascertainment of the longitudinal-dynamic response first of all involves a decision being made as to whether or not the braking effect of the partial braking longitudinal acceleration a_hc in the partial braking phase I should be heeded.

For this purpose, e.g. a reliability (confidence) Z is ascertained, e.g. as a scalar value between Z=0, i.e. quite unlikely, and Z=1 as maximum likelihood. In this case, Z can then be compared with a criticality threshold value Z_tres, i.e. as a test Z<Z_tres?

Figure 3:
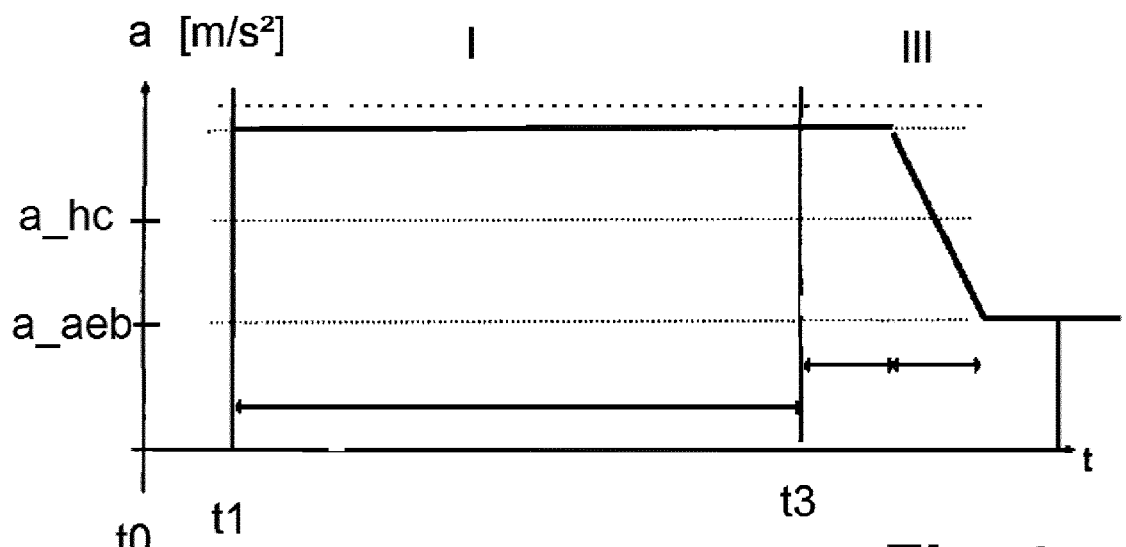
FIG. 3 shows a timing diagram corresponding to FIG. 2 for ascertaining a dynamic longitudinal response, according to a further embodiment of the invention.

If it is decided that the reliability Z is not adequate, the graph in FIG. 3 shows that a spatial function with a second degree of time is set up on the presumption of an acceleration just in the emergency braking phase III. It is therefore presumed in the present case that the periods Δt_I and Δt_II have no relevant braking effect as a result of the emergency braking system or as a result of the XBR signal, and a relevant autonomous braking operation, i.e. acceleration, first occurs in the emergency braking phase III. Fundamentally, however, an already present driver braking operation in phases I and II can continue to be heeded.

According to the second embodiment, excessively low reliability Z<Z tres therefore results in the autonomous partial braking longitudinal acceleration a_hc of the partial braking warning phase II being ignored. This is based on the observation that at the present time t0, at which the times t1, t2, t3 are presumed, it cannot yet safely be assumed that there is adequate certainty of the availability of or confidence in the ability to work. It is therefore firstly unclear at the time t0 whether an XBR can effectively be output for the haptic partial braking warning phase II. As such, e.g. some vehicles, at the request of the driver, e.g. by means of an operator control device 11, allow the entire emergency braking function or parts thereof to be shut down. As such, there may in particular be provision for only the warning phase I to be output as an audible warning, but for no haptic partial braking operation or partial braking phase II and no emergency braking phase III to take place.

Therefore, according to the second embodiment, an emergency braking operation as shown in FIG. 3, which no haptic partial braking warning phase II and hence no autonomous partial braking operation, is ascertained in the longitudinal-dynamic criterion in order to ascertain the times t1, t2, t3, the emergency braking operation in the emergency braking phase III possibly having to be performed by the driver himself. Such driver-initiated independent braking to avoid the collision does not involve a partial braking operation taking place beforehand, however.

This calculation on the basis of FIG. 3 takes place even though subsequently a haptic partial braking warning phase II of this kind is preferably nevertheless supposed to be initiated at the time t2. According to the graph in FIG. 3, e.g. an earlier time t1 is therefore ascertained, since the partial braking acceleration a_hc is ignored for the calculation.

In this case, in the second embodiment, excessively low reliability Z for the emergency braking operation can result in an acceleration a_aeb of the same value as in the first embodiment, i.e. for example a_aeb=−6 m/s$^2$, being presumed.

FIGS. 2 and 3 therefore depict the ideal trend according to the projection, i.e. according to the method for ascertaining an emergency braking operation. The method for performing the autonomous emergency braking operation subsequently preferably involves the initiation of the next particular phase being made dependent on a present rating of the situation, with in particular a criticality K of the present traffic situation, e.g. as the likelihood of a collision, being rated. This rating of a criticality K can in particular in turn include a rating of a present longitudinal-dynamic criterion K2-1, preferably also of a transverse-dynamic criterion K2-q. In this case, in particular the presently ascertained longitudinal distance dx and the presently ascertained driving dynamics variables v1, a1, v2, a2 are also relevant. As such, it is then e.g. possible for the criticality K to be compared with respective K threshold values K_tres I, K_tres_II and K_tres_III in order to decide whether the next phase I, II, III is initiated.

Figure 4A:
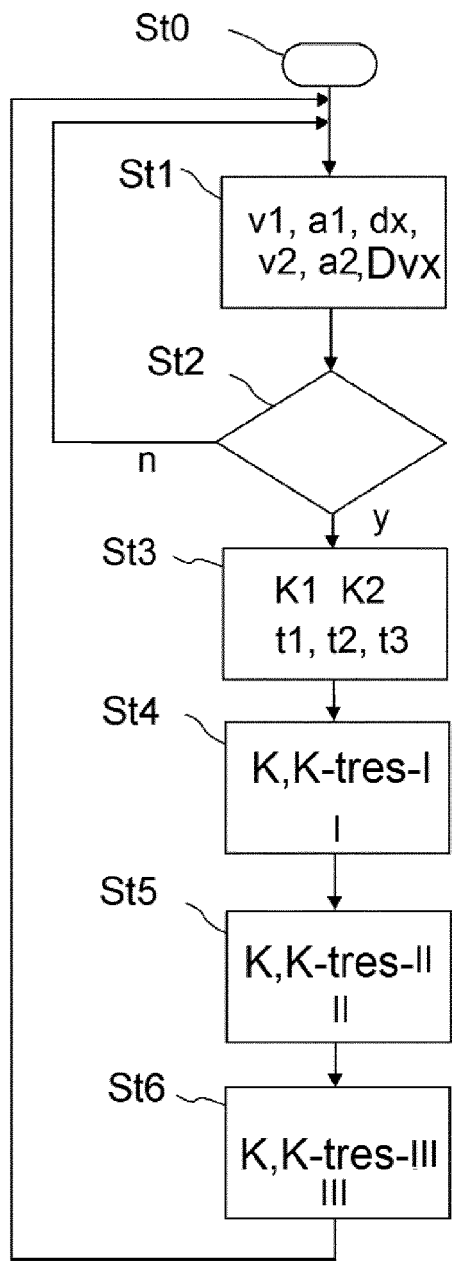
FIGS. 4a and 4b show flowcharts for methods according to two embodiments of the invention.
Figure 4B:
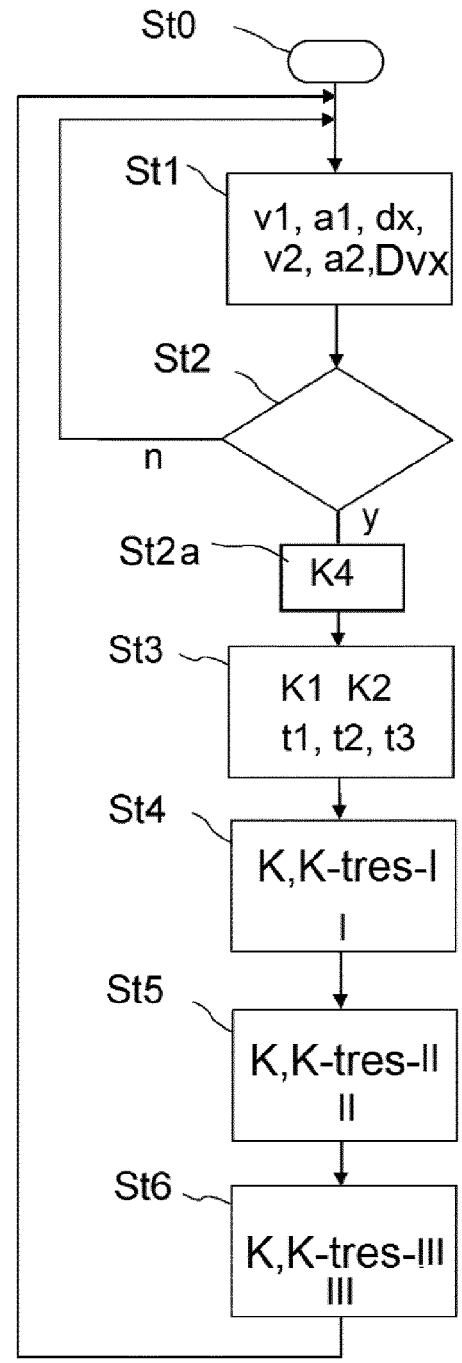

Methods according to the first and second embodiments are shown in the flowcharts of FIGS. 4a and 4b:

A start to the method of the first embodiment in FIG. 2 takes place, according to FIG. 4a, in step St0, right when the engine starts or the journey begins, where v1>0. Subsequently, data are continually picked up according to step St1, specifically in particular driving dynamics signals of the ego-vehicle 1, in particular the ego-velocity v1 is picked up as a velocity measurement signal S4, and furthermore distance measurement signals S1 of the distance sensor 4 are picked up. It is also possible for further driving dynamics signals, e.g. a longitudinal acceleration, to be picked up; it is accordingly also possible—in a manner not shown in FIG. 1—or transverse-dynamics signals, e.g. a transverse acceleration and/or a yaw rate of the ego-vehicle 1, to be picked up. From the distance measurement signal S1, object detection and object classification are furthermore performed in the control device 6 in accordance with step St1, these therefore involving an object 2, e.g. a vehicle traveling ahead, being recognized as such. In this case, it is accordingly also possible for the travel behavior of the object 2, i.e. in particular v2 and a2, to be ascertained from the time response of the distance measurement signals S1.

In step St2, the driving dynamics signals ascertained in step St1 are then taken as a basis for ascertaining whether an emergency braking method must be initiated. If this is the case, the y branch is followed in order to subsequently take the criteria K1 and K2 and possibly further criteria as a basis for ascertaining the entire emergency braking process with the three phases I, II, III in step St3, in particular with firm starting times t1, t2, t3 for initiating the next particular phase. Therefore, the phases and the starting times t1, t2, t3 are ascertained such that e.g. a collision is avoided and furthermore the legally required minimum periods, in particular Δt0_I and Δt_II, are adhered to and not exceeded.

Steps St0 to St3 therefore describe the method for ascertaining the emergency braking process; subsequently, in accordance with steps St4, St5 and St6, the phases I, II, III are then initiated, so that steps St0 to St6 describe the method for performing the emergency braking process. As already explained above, the real initiation of the next phases I, II, III preferably takes place not necessarily at the ascertained times t1, t2, t3, but rather in each case on the basis of present criticalities K and a comparison of the ascertained criticalities K with K threshold values.

The method of the second embodiment of FIG. 3 is shown in FIG. 4b and initially has steps St0 to St2 in line with FIG. 4a. There then follows an intermediate step St2a between step St2 and step St3. In the intermediate step St2a, a decision is made as to whether the longitudinal-dynamic response of the second criterion K2 of the starting times t1, t2, t3 shown in FIG. 2 or 3 is supposed to be ascertained, i.e. by heeding a partial braking warning phase II with the partial braking acceleration a be or without it. To this end, e.g. an availability criterion K4 can be presumed that results in a decision being made between these two alternatives for the calculation. Subsequently, the calculation and initiation of the phases I, II, III is then in turn performed in step St3 using the previously chosen calculation method, i.e. a calculation of the times t1, t2, t3.

The emergency braking operation is then in turn subsequently performed in steps St4, St5, St6. In this embodiment too, the phases I, II, III are not necessarily initiated at the starting times t1, t2, t3, but rather—as already explained above—real initiation of the next phases I, II, III preferably takes place in each case on the basis of present criticalities K and a comparison of the ascertained criticalities K with K threshold values K-tres-I, K-tres-I, K-tres-III.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Ego-vehicle
2 Object
3 Road
4 Distance sensor
5 Driving dynamics system
6 Control device
7 Velocity sensor
8 Wheel brakes
9 Warning indicator, indicator device, acoustic and/or visual
10 Brake lights
11 Operator control device for deactivating the autonomous braking function
a1 Ego-acceleration, first longitudinal acceleration
v1 Ego-velocity, first velocity of travel
x1 Ego-position
x2 Second position (object position)
v2 Second velocity
a2 Second longitudinal acceleration
aq Transverse acceleration of the ego-vehicle 1
ω Yaw rate of the ego-vehicle 1 dx Longitudinal distance
Dvx Longitudinal velocity difference
Dax Longitudinal relative acceleration difference
GL1, GL2 Dynamic motion equations
I First warning phase, FCW phase
II Haptic warning phase, partial braking warning phase, HCW phase
III Emergency braking phase, AEB phase
a_hc Partial braking longitudinal acceleration in the partial braking warning phase II
p_hc Partial-braking braking pressure in the partial braking warning phase II
a_aeb Emergency braking acceleration in the emergency braking phase III
p_aeb Emergency-braking braking pressure in the emergency braking phase III
S1 Distance measurement signals
S2 Braking signal
S3 Warning signal
S4 Brake light signal
t1, t2, t3 Starting times of the phases I, II, III
K1 Period criterion
K2 Dynamic criterion
K2-L Longitudinal-dynamic partial criterion
K2-q Transverse-dynamic partial criterion
K4 Decision criterion for choosing the calculation
K Criticality
K-tres-I, Criticality threshold values
K-tres-II, and
K-tres-III

The invention claimed is:

1. A method for ascertaining an autonomous emergency braking operation of an ego-vehicle, the method comprising:
picking up driving dynamics variables of the ego-vehicle;
picking up distance measurement signals;
ascertaining at least one longitudinal distance of the ego-vehicle from a forward object;
deciding to initiate an emergency braking operation based on the driving dynamics variables, the distance measurement signals, and the at least one longitudinal distance of the ego-vehicle from the forward object, and ascertaining:
a first starting point for initiating a warning phase by outputting a warning signal without initiating a braking operation,
a second starting point for initiating a subsequent partial braking phase with a first partial-braking braking pressure, and
a third starting point for initiating a subsequent emergency braking phase with a second emergency-braking braking pressure,
wherein ascertaining the starting points involves the use of:
a period criterion having minimum durations of the warning phase and/or of the partial braking phase, and
a dynamic criterion describing positions and/or velocities of the ego-vehicle and of the forward object in the warning phase, the subsequent partial braking phase, and the subsequent emergency braking phase,
wherein motion equations of the ego-vehicle and of the forward object with at least a second order of time are used in the dynamic criterion, and
wherein at least one of an emergency braking acceleration in the emergency braking phase and a partial braking acceleration in the partial braking phase are used in the dynamic criterion to heed a braking effect in the partial braking phase, and outputting the warning signal without initiating the braking operation at the first starting point, initiating the subsequent partial braking phase with the first partial-braking braking pressure at the second starting point, and initiating the subsequent emergency braking phase with the second emergency-braking braking pressure at the third starting point.

2. The method as claimed in claim 1, wherein the ascertained starting points are starting times of the warning phase, the subsequent partial braking phase, and the subsequent emergency braking phase, and the minimum durations used are minimum periods.

3. The method as claimed in claim 1, wherein deciding to initiate the emergency braking operation based on the driving dynamics variables, the distance measurement signals, and the at least one longitudinal distance of the ego-vehicle from the forward object involves the use of motion equations of the ego-vehicle and of the object or of difference values of the ego-vehicle and of the object with a second order of time.

4. The method as claimed in claim 1, wherein the partial braking acceleration in the partial braking phase is used in the dynamic criterion.

5. The method as claimed in claim 1, wherein the partial braking acceleration in the partial braking phase is used in the dynamic criterion only on the basis of a decision criterion that is decided in a decision step, and wherein a reliability of the production of the partial-braking braking pressure in the partial braking phase and of the emergency-braking braking pressure in the emergency braking phase, is rated in the decision step, and the reliability is compared with a reliability threshold value, and values above the reliability threshold value result in the partial braking acceleration being used for ascertaining the dynamic criterion, and values below the reliability threshold value result in the partial braking acceleration not being used.

6. The method as claimed in claim 1, wherein the following state variables or driving dynamics variables of the ego-vehicle are picked up:

an ego-velocity, an ego-acceleration of the ego-vehicle, and, by direct measurement or from the timing response of the longitudinal distance ascertained from the distance measurement signals, a longitudinal velocity difference in relation to the forward object, a second velocity of the forward object and a longitudinal acceleration difference.

7. The method as claimed in claim 1, wherein the dynamic criterion uses, as a longitudinal-dynamic partial criterion, the at least one longitudinal distance of the ego-vehicle from a forward object, a longitudinal acceleration on the basis of time, and, as a transverse-dynamic partial criterion, an evasion criterion by using a transverse response of the ego-vehicle.

8. The method as claimed in claim 1, wherein a definitely stipulated minimum duration of the warning phase and a minimum duration of the partial braking phase, which are minimum values that cannot have values below them are presumed for the period criterion.

9. A method for performing an autonomous emergency braking operation of an ego-vehicle, the method comprising:

performing a method for ascertaining the autonomous emergency braking operation of the ego-vehicle as claimed in claim 1, subsequently initiating the warning phase by outputting a warning signal to the driver on the basis of a present rating of the traffic situation, initiating the partial braking phase by producing a partial acceleration, a lower braking pressure or lesser braking effect, in order to produce a haptic braking-pressure report to the driver, on the basis of a present rating of the traffic situation, and initiating the emergency braking phase by producing an emergency braking acceleration with a superior braking effect or higher braking pressure on the basis of a present rating of the traffic situation, wherein the present rating of the traffic situation results in a present criticality of the traffic situation being ascertained and rated prior to initiation of each of the phases.

10. The method as claimed in claim 9, wherein the present rating of the traffic situation takes place prior to the initiation of the next phase by virtue of the currently ascertained criticality being compared with a respective K threshold value.

11. The method as claimed in claim 9, wherein the minimum duration, preferably minimum period, is still maintained even if a collision will take place when the at least one minimum duration is heeded.

12. An ego-vehicle comprising a control device, wherein the control device is configured to:

pick up a velocity-of-travel signal for an ego-velocity of travel of the ego-vehicle, pick up a distance measurement signal of at least one longitudinal distance of the ego-vehicle from a forward object, pick up driving dynamics variables of the ego-vehicle;

decide to initiate an emergency braking operation based on the velocity of travel signal, driving dynamics variables, the distance measurement signals, and the at least one longitudinal distance of the ego-vehicle from the forward object, and ascertain:

a first starting point for initiating a warning phase by outputting a warning signal without initiating a braking operation, a second starting point for initiating a subsequent partial braking phase with a first partial-braking braking pressure, and a third starting point for initiating a subsequent emergency braking phase with a second emergency-braking braking pressure, wherein ascertaining the starting points involves the use of:

a period criterion having minimum durations of the warning phase and/or of the partial braking phase, and a dynamic criterion describing positions and/or velocities of the ego-vehicle and of the forward object in the warning phase, the subsequent partial braking phase, and the subsequent emergency braking phase, wherein motion equations of the ego-vehicle and of the forward object with at least a second order of time are used in the dynamic criterion, and wherein at least one of an emergency braking acceleration in the emergency braking phase and a partial braking acceleration in the partial braking phase are used in the dynamic criterion to heed a braking effect in the partial braking phase, and output braking signals to wheel brakes in order to initiate a braking process of the ego-vehicle and to output the warning signal to a warning indicator in order to warn a driver, wherein the braking process comprises:

outputting the warning signal without initiating the braking operation at the first starting point, initiating the subsequent partial braking phase with the first partial-braking braking pressure at the second starting point, and initiating the subsequent emergency braking phase with the second emergency- braking braking pressure at the third starting point.

13. An ego-vehicle, the ego-vehicle comprising:

wheel brakes for performing a braking process, a distance sensor for ascertaining the at least one longitudinal distance of the ego-vehicle from a forward object and outputting distance measurement signals to a control device, wherein the control device is configured to:

pick up a velocity-of-travel signal for an ego-velocity of travel of the ego-vehicle, pick up the distance measurement signal of the at least one longitudinal distance of the ego-vehicle from the forward object, pick up driving dynamics variables of the ego-vehicle;

decide to initiate an emergency braking operation based on the velocity of travel signal, driving dynamics variables, the distance measurement signals, and the at least one longitudinal distance of the ego-vehicle from the forward object, and ascertain:

a first starting point for initiating a warning phase by outputting a warning signal without initiating a braking operation, a second starting point for initiating a subsequent partial braking phase with a first partial-braking braking pressure, and a third starting point for initiating a subsequent emergency braking phase with a second emergency-braking braking pressure, wherein ascertaining the starting points involves the use of:

a period criterion having minimum durations of the warning phase and/or of the partial braking phase, and a dynamic criterion describing positions and/or velocities of the ego-vehicle and of the forward object in the warning phase, the subsequent partial braking phase, and the subsequent emergency braking phase, wherein motion equations of the ego-vehicle and of the forward object with at least a second order of time are used in the dynamic criterion, and wherein at least one of an emergency braking acceleration in the emergency braking phase and a partial braking acceleration in the partial braking phase are used in the dynamic criterion to heed a braking effect in the partial braking phase, and output braking signals to the wheel brakes in order to initiate an autonomous partial braking phase and an autonomous emergency braking phase of the ego-vehicle and to output the warning signal to a warning indicator in order to warn atho driver.

* * * * *